May 1, 1928. 1,668,174
W. A. SNYDER
COMBINATION TABLE
Filed Feb. 25, 1926 2 Sheets-Sheet 1
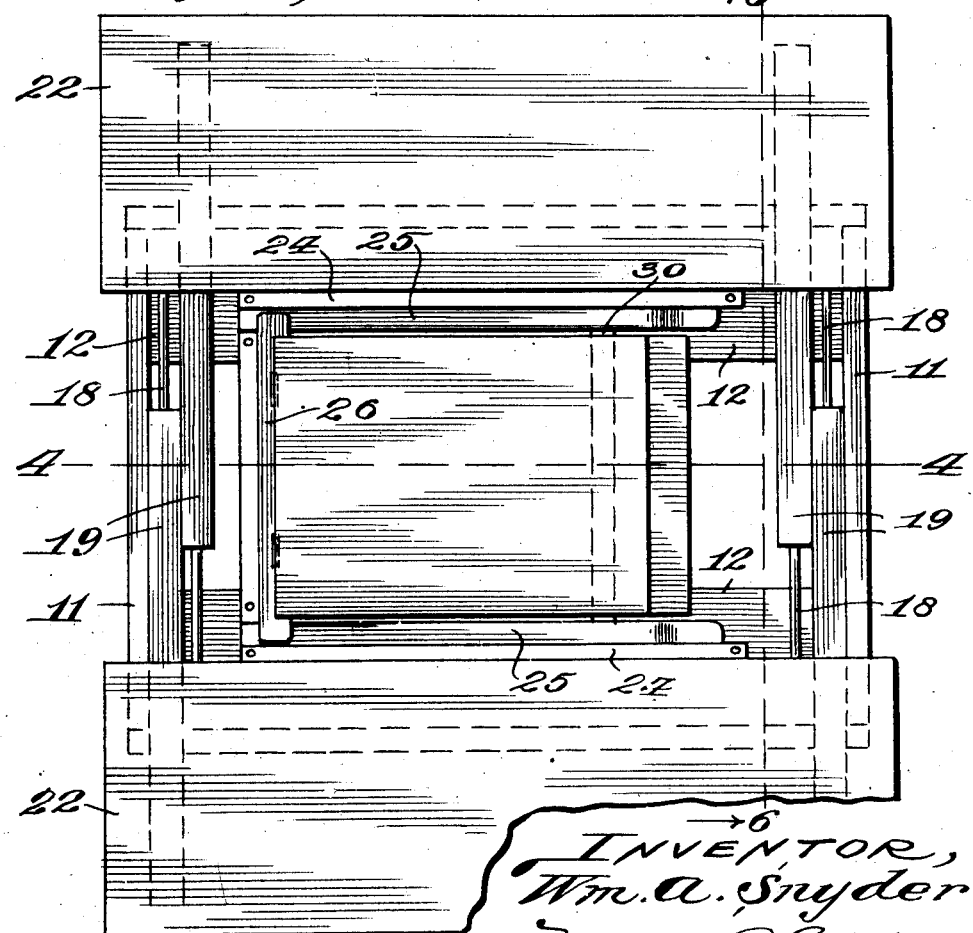

May 1, 1928.  
W. A. SNYDER  
COMBINATION TABLE  
Filed Feb. 25, 1926 2 Sheets-Sheet 2  
1,668,174
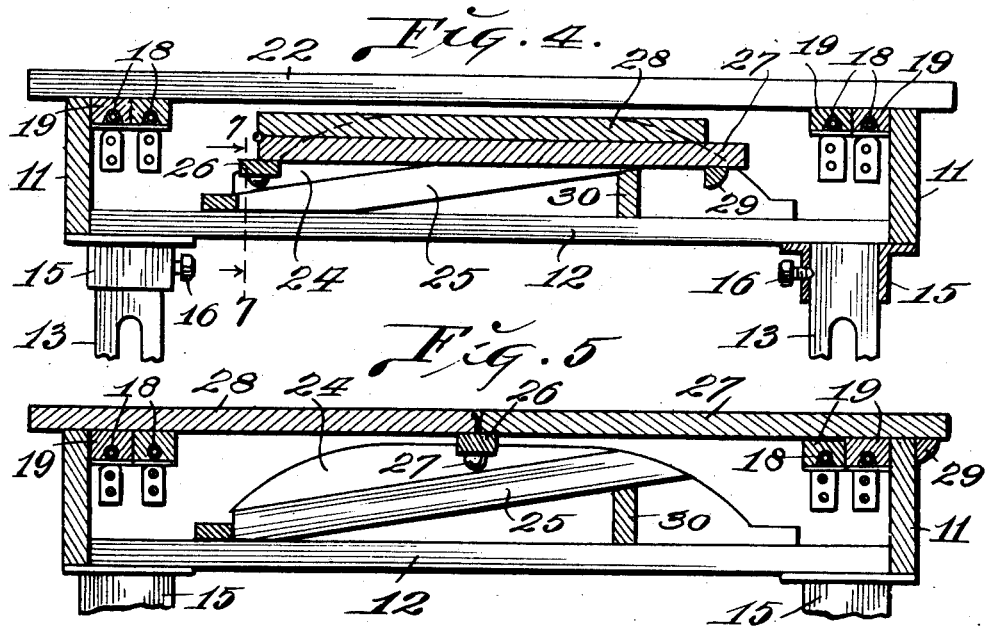
INVENTOR,  
Wm. A. Snyder.  
By Martin C. Smith atty.

Patented May 1, 1928.

1,668,174

UNITED STATES PATENT OFFICE.

WILLIAM A. SNYDER, OF LOS ANGELES, CALIFORNIA.

COMBINATION TABLE.

Application filed February 25, 1926. Serial No. 90,486.

My invention relates to a table that is designed for use either as a center table or a dining table and the principal objects of my invention are to provide a table having a top that may be varied in size according to the use to which the table is put, and further, to provide a table that is relatively simple in construction, capable of being economically produced, strong and substantial in structure and which may be readily manipulated when the top thereof is increased or diminished in size.

Further objects of my invention are to provide a combination center and dining table with one or more leaves which, while not in use, occupy positions within the frame of the table beneath the top thereof; further, to provide simple means whereby the extra leaf or leaves may be elevated so as to occupy the same plane with the leaves or panels that form the top of the table; and further, to provide improved means for mounting the sliding leaves or panels that constitute the table top.

With the foregoing and other objects in view, my invention consists in certain novel features of construction and arrangement of parts that will hereinafter be more fully described and claimed and illustrated in the accompanying drawings, in which—

Fig. 1 is a top plan view of my improved table when the same is converted into use as a center table.

Fig. 2 is a plan view of the table with an additional leaf arranged in the top so as to provide a larger table that may be used for dining purposes.

Fig. 3 is a plan view of the table with the parts of the top drawn apart and showing the extension leaf in folded condition within the frame of the table.

Fig. 4 is a cross section taken on the line 4—4 of Fig. 3.

Fig. 5 is a cross section similar to Fig. 4 and showing the folding extension leaf in position to form a part of the table top.

Fig. 6 is a cross section taken approximately on the line 6—6 of Fig. 3.

Fig. 7 is an enlarged detail section taken approximately on the line 7—7 of Fig. 4.

Fig. 8 is an enlarged detail section taken on the line 8—8 of Fig. 6.

Fig. 9 is a perspective view of one of the legs of the table.

Fig. 10 is a horizontal section taken on the line 10—10 of Fig. 9.

Fig. 11 is a sectional view of a modified form of the table having a drop leaf.

In the construction of my improved table, I make use of a rectangular frame that is composed of a pair of side rails 10 and a pair of end rails 11, and secured to the lower portions of said end rails 11 immediately adjacent to the side rails 10 are longitudinally disposed horizontally arranged rails or panels 12. The frame thus constructed is supported by legs or corner posts 13 which may be of any desired construction although I prefer to form these legs of sections of wood that are substantially square in cross section, and to form in said legs cross slots 14 that extend longitudinally of said legs.

The upper ends of the legs may be secured to the frame of the table in any suitable manner, but I prefer to arrange on the underside of the frame at the corners thereof metal sockets such as 15 that receive the upper ends of the legs and the latter being clamped in said sockets by bolts or set screws 16. This construction enables the legs to be readily removed from the body of the table when the latter is packed for storage or transportation.

Arranged within the frame of the table and adjacent to the end walls 11 thereof are pairs of tubular rods 18, the ends of which are bent downwardly and secured to the inner faces of the side rails 10, and these tubular rods serve as supports or guides for sliding bars 19, one of the latter being mounted on each tubular rod and the underside of the bar being provided with a longitudinally disposed groove 20 that accommodates the respective tubular rod.

Secured to the undersides of the sliding bars 19 and underlying the tubular rods 18 are keeper plates 21 which retain the sliding bars in engagement with the respective supporting rods. The four bars 19 are arranged in pairs and secured to the outer portions of the respective members of said pairs and overlying the same and the table frame are table top sections or leaves 22, and thus as a result of the mounting of the bars 19 on the supporting rods 18, the two table top sections 22 may be moved toward and away from each other over the top of the frame of the table.

When the table top sections 22 are moved inwardly so that their inner edges are in contact with each other, the top of the table appears as illustrated in Fig. 1 and the relatively small area of said top enables the table to be conveniently used as a center table or a side table. For the accommodation of the outer portions of the sliding bars 19 when the table top sections 22 are moved outwardly away from each other, the side rails of the table frame are provided with openings 23, through which said bars 19 may readily pass.

Arranged longitudinally on the upper faces and inner portions of the frame members 12 are upright panels 24 and arranged on the inner faces of these panels are inclined rails 25. Arranged between the upright panels 24 is a rail 26, the ends of which overlie the inclined rails 25 and arranged on the undersides of the ends of said rail 26 are small caster wheels or anti-friction bearing members 27 that ride directly upon the upper faces of said inclined rails.

Secured to rail 26 is one end of a table top section 27 and hinged to that end of said section that is secured to said rail 26 is a folding table top section 28. The table top sections 27 and 28 constitute a leaf that is adapted to be positioned beneath leaves or sections 22 as illustrated in Fig. 2, thereby giving extra width to the table and enabling the same to be used as a dining table or a large center table.

Secured to the underside of section 27 adjacent to its outer end is a transversely disposed rail or moulding strip 29, which, when the sections 27 and 28 are functioning as a table leaf, occupies a position immediately against the outer face of the corresponding end panel 11 (see Fig. 5).

When my improved table is arranged to serve as a center table or a side table, section or panel 28 is folded over onto the top of panel or section 27 and the two panels are shifted so that the rail 26 having the anti-friction members 27 occupies a transverse position between the lower ends of the inclined rails 25 and thus both of said members 27 and 28 are positioned wholly below the plane occupied by the table top sections 22.

When so positioned, the end of section 27 opposite the end that is secured to rail 26 rests on a transverse rail 30 that is positioned between frame members 12. When the sections 27 and 28 are thus positioned within the frame of the table, the table top sections 22 are moved toward each other until their inner edges are in engagement with each other and said parts may be temporarily locked to each other by hooks or suitable fastening devices (not shown). Thus the table top has considerably less width than length and the table under such conditions, may be conveniently used as a center table or a side table.

To increase the size of the table top in order that it may be used as a dinner table, the top members 22 are moved outwardly away from each other, during which action the bars 19 slide on the fixed supporting rods 18 and when the folded leaf member is exposed, as illustrated in Fig. 3, the section 28 is swung upwardly and thence over into a substantially horizontal plane and simultaneous with this action, the folding members are moved so that the anti-friction bearings 27' ride upwardly on the inclined upper surfaces of the rails 25. These inclined rails are disposed so that when the outer ends of members 27 and 28 coincide with the ends of top members 22, the folding leaf or panel comprising the members 27 and 28 occupies the same horizontal plane with top members 22 and thus a table top of increased size is provided.

To retain the folding leaf or section in its opened position, the rail or strip 29 on the underside of the end of member 27 is positioned so that it bears against the upper portion of the corresponding end panel 11 (see Fig. 5). Inasmuch as the inner ends of members 27 and 28 bear directly on rail 27 and the latter is firmly supported upon the inclined rails 25, the folding leaf or section is, while in use, supported in a firm and substantial manner and it cooperates with the top members 22 in providing a table top of increased area as seen in Fig. 2.

In some instances it may be found desirable to hinge drop leaves such as 31, Fig. 11, to the outer edges of top members 22, and when such construction is employed, supporting arms such as 32 are pivotally connected to the underside of the drop leaf 31 and which arms pass through slotted brackets 33 that are secured on the underside of adjacent frame member 12. When this drop leaf is swung upward into a horizontal plane as shown by dotted lines in Fig. 11, a notch such as 34 that is formed in the underside of the said arm 32 receives a portion of the bracket 33, thus firmly securing the drop leaf in its elevated position.

While I have shown and described the rail 26 as being provided with anti-friction bearings that traverse the upper surfaces of the inclined rails 25, it will be understood that the same results may be accomplished by arranging pins on the ends of the rail 26 and which pins project into inclined grooves in the inner faces of the walls 24.

Thus it will be seen that I have provided a combined table that is relatively simple in construction, capable of being easily and economically produced, and having a top that may be readily increased or decreased in area so as to enable the table to be used for various purposes.

It will be readily understood that minor changes in the size, form and construction of the various parts of my improved combination table may be made and substituted for those herein shown and described without departing from the spirit of my invention, the scope of which is set forth in the appended claims.

I claim as my invention:

1. In a combination table, a rectangular frame, a pair of table top sections arranged for sliding movement toward and away from each other on said frame, ledges projecting inwardly from the sides of said frame, upright panels secured on top of said ledges and extending lengthwise thereon; inclined rails fixed to the inner faces of said panels, a two part table top section arranged in the frame between said upright panels, the two parts of said table top section being connected to each other at one end by a hinge, a rail secured to the end of the lower member of the two part table top section, the ends of which rail overlie the upper edges of the inclined rails, antifriction members seated in the underface of the end portions of said rail, which antifriction members bear on the upper faces of the inclined rails and a transversely disposed strip arranged on the under face of the lower member of the two part table top section opposite from the end that is provided with a rail that bears on the inclined rails, which strip is adapted to bear on the outer face of one of the end rails of the frame of the table when the two part table top section is unfolded and elevated to cooperate with the sliding table top sections in forming the table top.

2. In a combination table, a rectangular frame, a pair of table top sections arranged for sliding movement toward and away from each other on said frame, ledges projecting inwardly from the sides of said frame, upright panels arranged on said ledges adjacent to their inner edges and extending lengthwise thereon, inclined rails secured to the inner faces of said upright panels, a two part table top section arranged in the frame between the upright panels, the two parts of said table top section being connected to each other at one end by a hinge; a rail secured to the underface of the lower member of the two table top sections at the hinged end thereof, a portion of which rail projects beyond the edge of the table top section to which it is secured, and antifriction members seated in the underface of said rail adjacent to the ends thereof, which antifriction members bear on the upper faces of the inclined rails.

In testimony whereof I affix my signature.

WILLIAM A. SNYDER.